Figure 1:
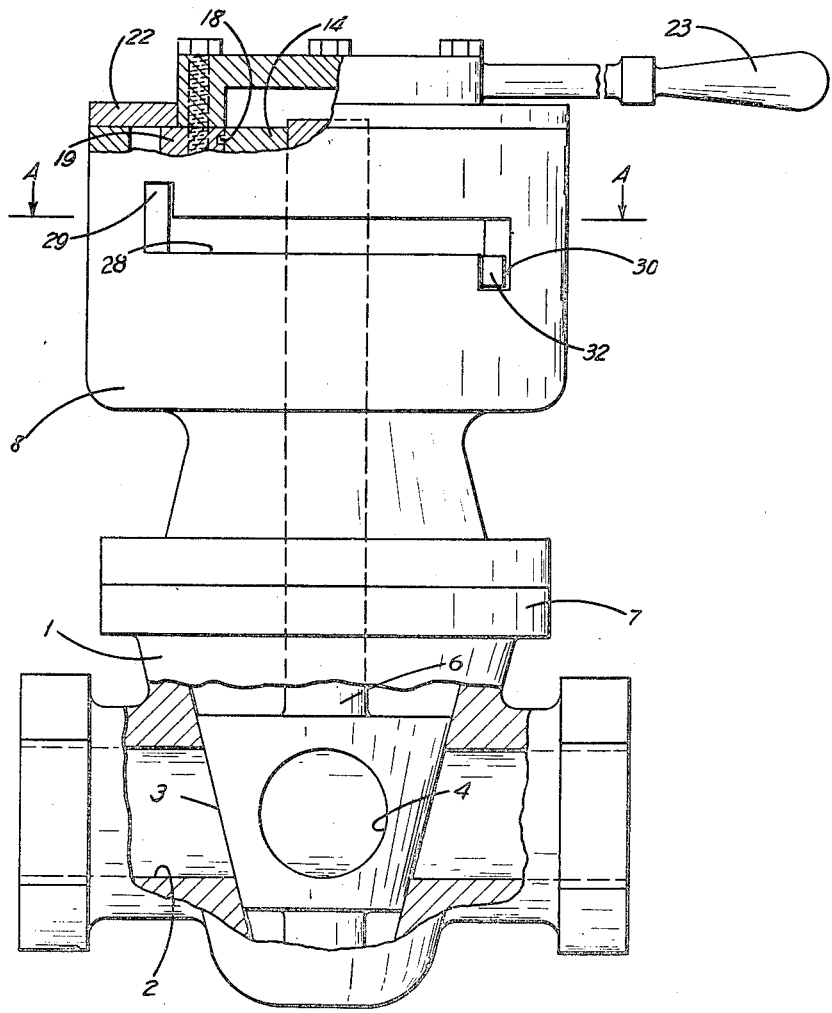

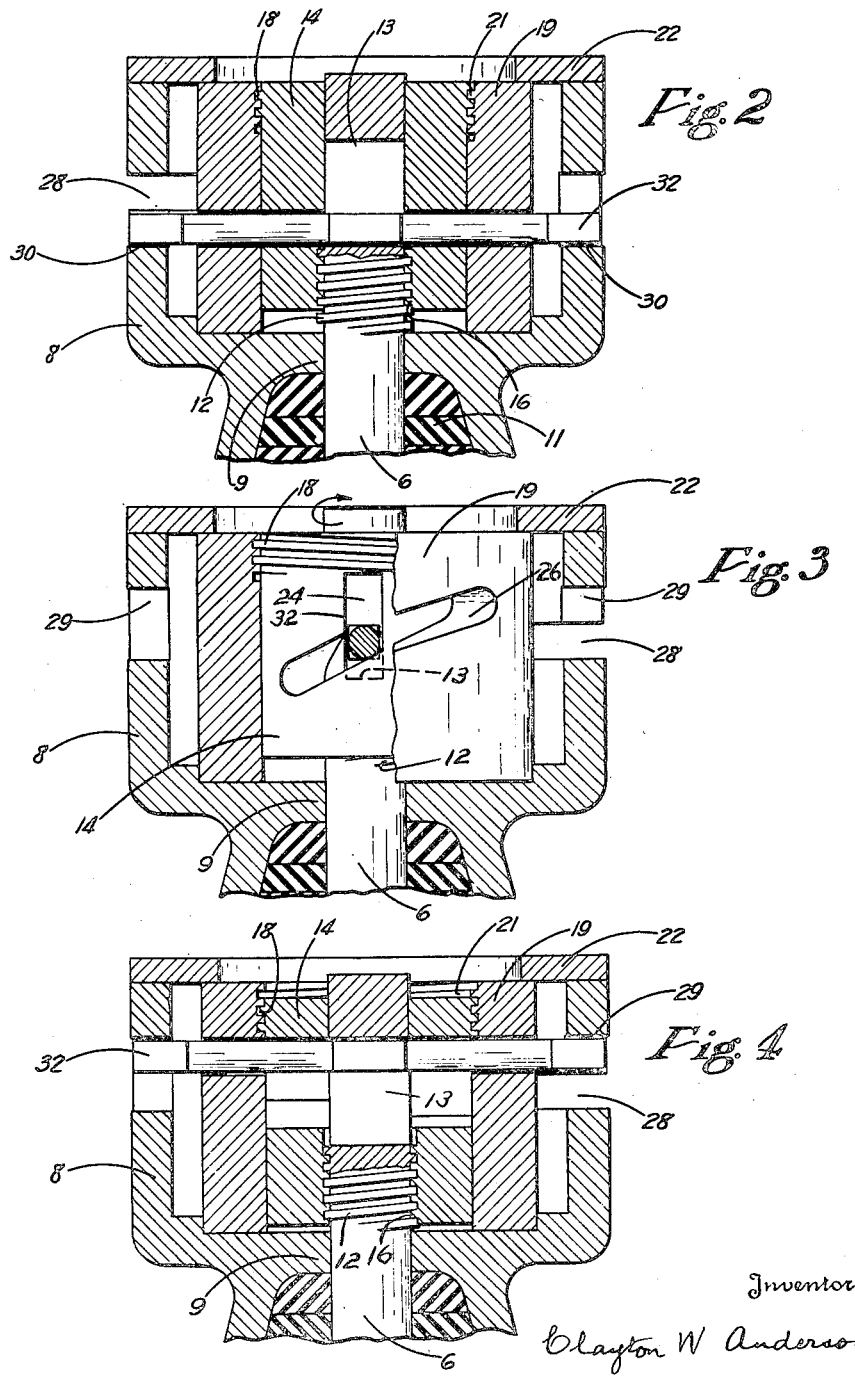

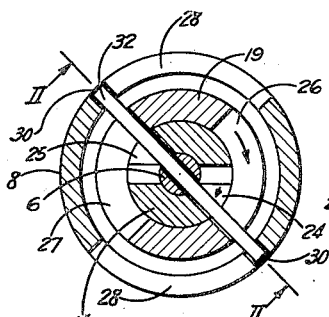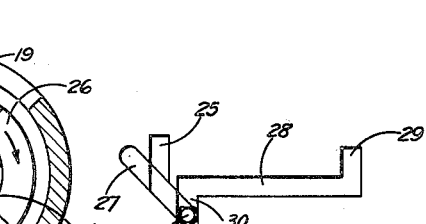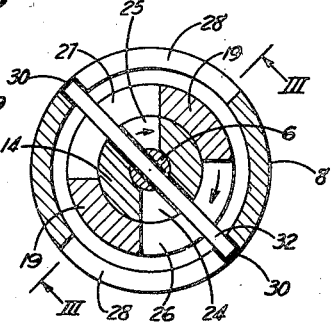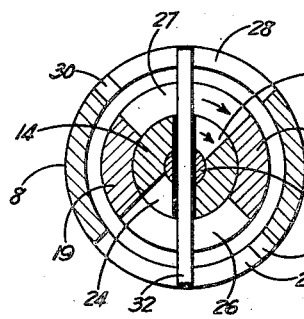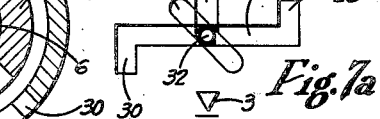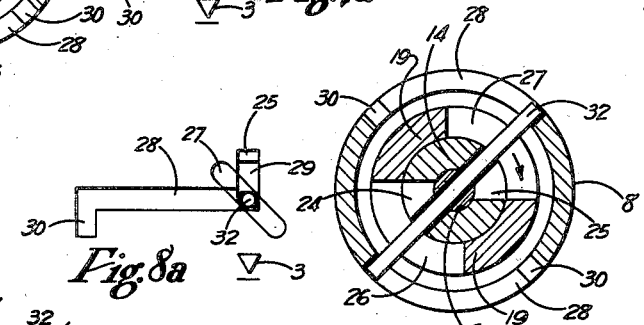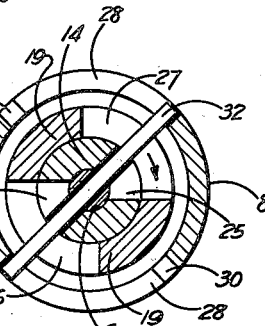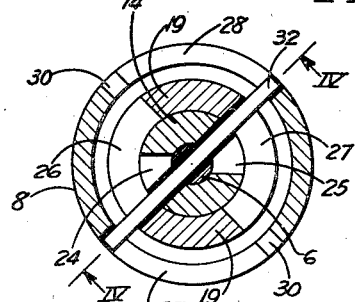

Patented Mar. 21, 1950

2,501,150

UNITED STATES PATENT OFFICE 2,501,150

OPERATING MECHANISM FOR AXIALLY AND ROTATABLY MOVABLE VALVE PLUGS

Clayton W. Anderson, Scottdale, Pa., assignor to Kathryn Schmidt Anderson, Scottdale, Pa.

Application April 21, 1948, Serial No. 22,355

4 Claims. (Cl. 74—22)

This invention relates to operating mechanism for axially movable valve plugs, and more particularly to means for opening and closing valves having tapered or conical plugs which are moved axially from their seats before being rotated and are returned axially to their seats after rotation.

It is among the objects of this invention to provide such operating mechanism in which screw threads are used for moving the plug axially, and in which unseating, rotating, and reseating are accomplished by continuous rotation of an operating member in the same direction.

In accordance with this invention the stem of an axially movable valve plug is provided with a screw thread and is encircled by a rotatable and axially movable sleeve. For descriptive purposes only, it will be assumed that the stem is vertical. The sleeve is provided with an internal thread registering with the stem thread and also is provided with an external thread of opposite pitch. In addition, the sleeve has a pair of diametrically opposite slots through it, each of which has a vertical portion and an inclined portion meeting at an oblique angle. The sleeve is encircled by a rotatable cam ring that is provided with an internal thread registering with the external thread of the sleeve. The ring also has a pair of diametrically opposite inclined slots through it, an end portion of each of these slots normally registering with the inclined portion of the adjacent sleeve slot. The ring is rotatably mounted in an encircling stationary member, such as a housing for the ring, provided in its side wall with a pair of diametrically opposite horizontal slots. Each of these slots has an upward vertical extension at one end and a downward vertical extension at the other end. Each upward extension is beside the registering upper ends of a cam slot and sleeve slot when the plug is in one of its seated positions, and the downward extension is beside the registering lower ends of the same cam slot and sleeve slot when the plug is turned to the other of those positions. A cross member is mounted on the stem for limited vertical movement relative to it, but any rotation of that member in a horizontal plane will rotate the stem. Preferably, the cross member extends through a vertical slot extending transversely through the stem. The cross member also extends through one end of the sleeve and cam slots normally while projecting into a pair of the slot extensions in the ring housing. Suitable means is provided for rotating the cam ring, so that the inclined walls of its slots will move the cross member vertically in a pair of the housing slot extensions while the stem is moved axially to unseat the plug by means of relative rotation between one of the sleeve threads and the thread registering with it. Further rotation of the ring in the same direction causes the inclined cam slots to move the ends of the cross member horizontally in the horizontal slots to turn the stem, and then the ring moves the cross member vertically in the other pair of the housing slot extensions while the stem is moved axially to seat the plug by means of relative rotation between the other of the sleeve threads and the thread registering with it.

The preferred embodiment of the invention is illustrated in the accompanying drawings in which Fig. 1 is a side view, partly broken away, showing the plug seated and closed; Fig. 2 is a fragmentary central vertical section (line II—II of Fig. 5) showing the actuating parts in the same positions they occupy in Fig. 1 when the valve is closed; Fig. 3 is a fragmentary vertical section (line III—III of Fig. 6) through the actuating parts when the plug is unseated and ready to be rotated; Fig. 4 is a fragmentary vertical section (line IV—IV of Fig. 9) of the actuating parts when the plug is seated in its open position; Figs. 5 to 9 are somewhat diagrammatic horizontal sections, taken on the line A—A in Fig. 1, of the actuating parts in five successive positions; and Figs. 5a to 9a are diagrammatic side views of the sleeve, cam and fixed slots at the far side of the valve and the cross pin extending through them, each successive figure illustrating the same relative positions of those slots and the pin and valve plug as represented by the figure beside it. In Figs. 5, 6, 7, 8 and 9 the inclined slots are shown as if they were horizontal and in the same plane as the housing slots, so that the full length of the inclined slots will appear in a horizontal section.

Referring to the drawings, a valve casing 1 is provided with the usual passage 2 in which there is a downwardly tapered valve plug 3 provided with a transverse passage 4. Rigidly connected to the top of the plug is a valve stem 6 that extends up through a central opening in a flange 7 at the top of the casing. Rigidly mounted on this flange is a cam housing 8 having a central horizontal wall 9 (Fig. 2) through which the stem extends. A packing gland 11 is formed between this wall and the lower wall of the housing. The stem is both rotatably and slidably mounted in the valve casing and cam housing.

In the cylindrical upper portion of the cam housing the valve stem is provided with a screw thread 12, above which a vertical slot 13 extends transversely through the stem. Encircling the threaded and slotted portion of the stem is a sleeve 14 that is free to move up and down in the housing. The sleeve is provided with an internal thread 16 which registers with the thread 12 on the stem, these threads generally being near the bottom of the sleeve. Around the outside of the sleeve, generally near its upper end, is another screw thread 18, but this thread is of opposite pitch from the internal thread. The sleeve is encircled by a cam ring 19 which has an internal thread 21 registering with the external thread on the sleeve. The cam ring is rotatable inside housing 8, but it is prevented from moving vertically therein by an annular cap 22 secured to the top of the housing and overlying part of the ring.

Suitable operating means, such as a gear or handle 23, is rigidly connected to the upper end of the cam ring to permit it to be rotated. It will be seen that if the ring rotates the sleeve around the stem, the internal thread 16 of the sleeve will move the stem axially in one direction, but if the ring rotates around the sleeve while the latter is locked to the stem, the external thread 18 of the sleeve will move the stem axially in the opposite direction. If all three members rotate together, the valve plug will be turned between open and closed position.

To permit these different movements to be accomplished, the sleeve 14 is provided with a pair of diametrically opposite slots 24 and 25, the near one 24 being shown in Fig. 3. Each slot has a vertical portion and an inclined portion meeting at an oblique angle at their inner ends. As shown in Fig. 3, the vertical portion forms the upper half of a slot, but it could form the lower half. The inclined portions of the two slots extend in the same direction around the sleeve. The cam ring 19 likewise is provided with a pair of diametrically opposite slots 26 and 27, but these slots are straight (except for the curvature of the ring) and are inclined throughout their length at the same angle as the inclined lower portions of the sleeve slots, as indicated in Fig. 9a. The inclined portion of each sleeve slot normally registers with the lower half of the adjacent cam slot.

The side wall of housing 8 is provided with a pair of diametrically opposite slots 28 which will be called horizontal because the major portions of them are horizontal although each has a short upward vertical extension 29 at one end and a short downward vertical extension 30 at the other end. Each downward extension is beside the lower end of the adjacent cam slot when the valve plug 3 is in one of its seated positions (Fig. 5a), but the upward extension of the same slot is beside the upper end of the same cam slot when the plug is in the other seated position (Fig. 9a). The height of the stem slot 13 need be no greater than the vertical distance between the bottom of a downward slot extension and the top of an upward slot extension. The length of the horizontal slots depends on how many degrees the plug is to turn. As it usually is turned 90° between open and closed positions, each horizontal slot should extend a little more than 90° around the cam housing. The inclined slots 24 and 25 of the cam ring likewise should extend from the level of the lower ends of the downward slot extensions 30 to the level of the upper ends of the upward slot extensions 29. The length of the cam slots depends on how many degrees the cam ring is to be rotated. If it is to turn 180° to turn the valve plug 90°, the cam slots should extend around the cam ring the same number of degrees as the housing slots extend around the cam housing, which will mean that when the lower end of a cam slot registers with the lower end of a slot extension 30, the upper end of the cam slot will register with the upper end of the upward extension 29 of the other housing slot 28.

Extending through the stem slot 13 is a cross member or pin 32 that fits snugly in the stem but is slidable vertically in its slot. The portion of the pin in the slot may be square in cross section. The pin has cylindrical portions that extend out through the sleeve and cam slots, and squared end portions that project into the housing slots. The pin engages the walls of all of the slots snugly but slidably. The ends of the pin are in a pair of the housing slot extensions when the valve is either open or closed. Whether the valve is open or closed when the pin is in the downward extensions 30 depends on the design of the valve and is immaterial to this invention. Fig. 1 of the drawings shows the valve closed at that time.

Assuming that cam ring 19 is to be turned clockwise to open the valve, the pitch of stem thread 12 is such as to raise the valve stem (or lower it if the plug is tapered upward) when sleeve 14 rotates around it, because, with the lower portions of sleeve slots 24 and 25 inclined like cam slots 26 and 27, the sleeve must turn with the cam ring at first, preferably for the first 45° of rotation. Under these conditions, when the valve is closed with the plug seated and its passage 4 at right angles to casing passage 2 as shown in Fig. 1, the cross pin 32 extends through the lower ends of the sleeve and cam slots and into the lower ends of the downward extensions 30 of horizontal slots 28, as shown in Figs. 1, 2, 5 and 5a.

To open the valve the cam ring 19 is turned 180° clockwise from the position shown in Fig. 5 to that shown in Fig. 9. During the first 45° of rotation to the position shown in Figs. 3 and 6, the valve stem can not turn, because the cross pin 32 is in the lower slot extensions 30 in housing 8, but the lower walls of the inclined cam slots force the pin to move upward in those extensions until it is able to enter the horizontal portions of horizontal slots 28, as indicated in Fig. 6a. The upwardly moving pin presses against the upper walls of the inclined lower portions of the sleeve slots and thereby causes the sleeve to rotate in unison with the ring. While the stem is prevented by the pin from turning, the internal sleeve threads 16 rotating around the stem raise it and thereby unseat the valve plug by a straight upward movement. As soon as the cross pin engages the upper walls of the horizontal slots the pin can rise no higher in the sleeve and cam slots, but can move sideways in the horizontal slots. Consequently, for the next 90° of rotation of the ring the pin turns in unison with the ring and sleeve and thereby turns the stem and valve plug. The relative positions of the moving parts when the pin is halfway through the horizontal slots is shown in Figs. 7 and 7a. The rotation or sidewise movement of the pin is stopped when it strikes the ends of the horizontal slots, as shown in Figs. 8 and 8a.

For the final 45° of ring rotation the cam slots again move the pin upward, this time in the upward extensions 29 of the horizontal slots. However, the sleeve no longer can turn with the ring, because the pin has entered the vertical portions of the sleeve slots whose vertical side walls engage the sides of the pin and thereby prevent the sleeve from turning. Therefore, while the pin moves upward in the vertical slots and keeps the stem and sleeve from rotating, the cam ring rotates around the sleeve. As the ring thread 21 is of the opposite pitch from the stem thread, the ring screws the sleeve down with the stem, as shown in Fig. 4, and thereby reseats the valve plug, but with the plug passage in axial alignment with the valve casing passage so that the valve is open. By the time the plug is seated, the cross pin is at the upper ends of the vertical slots, as indicated in Figs. 9 and 9a. The upper ends of sleeve slots 24 and 25 originally projected above the tops of slot extensions 29 (Fig. 8a), because, of course, the sleeve slots must move downward with the sleeve, so the extra length is necessary.

When it is desired to close the valve, the cam ring is turned in the opposite direction. During the first 45° of rotation the sleeve is lifted by the ring thread 21 to unseat the plug. The ring and sleeve and stem then rotate together for 90° to turn the plug. During the last 45° of ring rotation the sleeve turns with the ring while the stem is held by the cross pin, so the threads inside the sleeve force the plug straight down to its seat.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Operating mechanism for an axially movable valve plug adapted to be rotated from closed position to open position and back, said mechanism comprising a vertical stem for the plug provided with a screw thread, a rotatable and axially movable sleeve encircling the stem and provided with an internal thread registering with said stem thread and also provided with an external thread of opposite pitch from said internal thread, the sleeve having a pair of circumferentially spaced slots through it, each of said sleeve slots having a vertical portion and an inclined portion meeting at an oblique angle, a rotatable cam ring encircling the sleeve and provided with an internal thread registering with the external thread of the sleeve, the ring having a pair of circumferentially spaced inclined slots through it with an end portion of each normally registering with the inclined portion of a sleeve slot, and means for rotating said ring from one predetermined position to another predetermined position and back, a stationary member encircling the ring and provided in its side wall with a pair of circumferentially spaced horizontal slots, each of said horizontal slots having an upward vertical extension at one end and a downward vertical extension at the other end with the upward extension beside the upper ends of a ring slot and sleeve slot when the ring is in one of said positions and with the downward extension beside the lower ends of the same ring slot and sleeve slot when the ring is turned to the other of said positions, and a cross member mounted on said stem for limited vertical movement relative thereto, said cross member also extending through one end of said sleeve and ring slots normally while projecting into a pair of said slot extensions.

2. Operating mechanism for an axially movable valve plug adapted to be rotated from closed position to open position and back, said mechanism comprising a vertical stem for the plug provided with a screw thread and having a vertical slot extending transversely through it, a rotatable and axially movable sleeve encircling the stem and provided with an internal thread registering with said stem thread and also provided with an external thread of opposite pitch from said internal thread, the sleeve having a pair of circumferentially spaced slots through it, each of said sleeve slots having a vertical portion and an inclined portion meeting at an oblique angle, a rotatable cam ring encircling the sleeve and provided with an internal thread registering with the external thread of the sleeve, the ring having a pair of circumferentially spaced inclined slots through it with an end portion of each normally registering with the inclined portion of a sleeve slot, a stationary member encircling the ring and provided in its side wall with a pair of circumferentially spaced horizontal slots, each of said horizontal slots having an upward vertical extension at one end and a downward vertical extension at the other end with the upward extension beside the upper ends of a ring slot and sleeve slot when the plug is in one of said positions and with the downward extension beside the lower ends of the same ring slot and sleeve slot when the plug is turned to the other of said positions, a cross pin extending through the stem slot and movable vertically therein, said pin also extending through one end of said sleeve and ring slots normally while projecting into a pair of said slot extensions, and means for rotating said ring, whereby inclined walls of the ring slots will move the pin vertically in a pair of said slot extensions while the stem is moved axially in one direction by means of relative rotation between one of said sleeve threads and the thread registering with it, and whereby during further rotation of the ring the inclined walls of the ring slots will move the pin horizontally in the horizontal slots to turn the stem and then will move the pin vertically in the other pair of said slot extensions while the stem is moved axially in the opposite direction by means of relative rotation between the other of said sleeve threads and the thread registering with it.

3. Operating mechanism for an axially movable valve plug adapted to be rotated from closed position to open position and back, said mechanism comprising a vertical stem for the plug provided with a screw thread and having a vertical slot extending transversely through it, a rotatable and axially movable sleeve encircling the stem and provided with an internal thread registering with said stem thread and also provided with an external thread of opposite pitch from said internal thread, the sleeve having a pair of circumferentially spaced slots through it, each of said sleeve slots having a vertical portion and an inclined portion meeting at an oblique angle, a rotatable cam ring encircling the sleeve and provided with an internal thread registering with the external thread of the sleeve, the ring having a pair of circumferentially spaced inclined slots through it with an end portion of each normally registering with the inclined portion of a sleeve slot, a stationary member encircling the ring and provided in its side wall with a pair of circumferentially spaced horizontal slots, each of said horizontal slots having an upward vertical extension at one end normally beside the upper end of one of the ring slots and a downward extension at the other end normally beside the lower end of the other ring slot, a cross pin extending through the stem slot and movable vertically therein, said pin also extending through one end of said sleeve and ring slots normally while projecting into a pair of said slot extensions, and means for rotating said ring, whereby inclined walls of the ring slots will move the pin vertically in a pair of said slot extensions while the stem is moved axially in one direction by means of relative rotation between one of said sleeve threads and the thread registering with it, and whereby during further rotation of the ring the inclined walls of the ring slots will move the pin horizontally in the horizontal slots to turn the stem and then will move the pin vertically in the other pair of said slot extensions while the stem is moved axially in the opposite direction by means of relative rotation between the other of said sleeve threads and the thread registering with it.

4. Operating mechanism for an axially movable valve plug adapted to be rotated from closed position to open position and back, said mechanism comprising a vertical stem for the plug provided with a screw thread and having a vertical slot extending transversely through it, a rotatable and axially movable sleeve encircling the stem and provided with an internal thread registering with said stem thread and also provided with an external thread of opposite pitch from said internal thread, the sleeve having a pair of circumferentially spaced slots through it, each of said sleeve slots having a vertical portion and an inclined portion meeting at an oblique angle, a rotatable cam ring encircling the sleeve and provided with an internal thread registering with the external thread of the sleeve, the ring having a pair of circumferentially spaced inclined slots through it with an end portion of each normally registering with the inclined portion of a sleeve slot, a stationary member encircling the ring and provided in its side wall with a pair of circumferentially spaced horizontal slots, and means for rotating said ring approximately 180° in said stationary member, each of said horizontal slots having an upward vertical extension at one end and a downward vertical extension at the other end with the upward extension beside the upper ends of a ring slot and sleeve slot when the ring is in one of said positions and with the downward extension beside the lower ends of the same ring slot and sleeve slot when the ring is turned to the other of said positions, and a cross pin extending through the stem slot and movable vertically therein, said pin also extending through one end of said sleeve and ring slots normally while projecting into a pair of said slot extensions, said horizontal slots being long enough to permit the pin to be turned 90° by the ring, inclined walls of the ring slots being adapted to move the pin vertically in a pair of said slot extensions during the first 45° and last 45° of ring rotation, whereby the stem first is moved axially in one direction by means of relative rotation between a pair of said registering threads, then is rotated 90°, and then is moved axially in the opposite direction by means of relative rotation between the other pair of registering threads.

CLAYTON W. ANDERSON.

REFERENCES CITED

The following references are of record in the file of this patent:

UNITED STATES PATENTS

| Number | Name | Date |
|---|---|---|
| 1,892,574 | Huhn | Dec. 27, 1932 |
| 2,392,880 | Reed | Jan. 15, 1946 |
| 2,443,995 | Snyder | June 22, 1948 |